United States Patent [19]

Kinoshita

[11] 4,091,967
[45] May 30, 1978

[54] DEVICE FOR DEALING WITH THE SCRAPS OF FOAMED THERMOPLASTIC SYNTHETIC RESINS

[75] Inventor: Tomoo Kinoshita, Tokyo, Japan

[73] Assignee: Nihon Repro Machine Kogyo Kabushiki Kaisha, Japan

[21] Appl. No.: 759,674

[22] Filed: Jan. 17, 1977

[30] Foreign Application Priority Data

Apr. 2, 1976 Japan .................................. 51-36106

[51] Int. Cl.² .............................................. B29B 1/06
[52] U.S. Cl. .................................... 222/238; 222/328; 425/202
[58] Field of Search ............................. 259/191–193; 425/202; 222/238, 235, 146 H, 146 HE, 413, 280, 241, 564, 328

[56] References Cited

U.S. PATENT DOCUMENTS

| 505,975 | 10/1893 | Fate | 259/192 |
|---|---|---|---|
| 855,379 | 5/1907 | Bangs | 425/202 |
| 2,991,870 | 7/1961 | Griffith et al. | 222/241 X |

Primary Examiner—Robert B. Reeves
Assistant Examiner—David A. Scherbel
Attorney, Agent, or Firm—Oblon, Fisher, Spivak, McClelland & Maier

[57] ABSTRACT

A device for dealing with chips and cut ends during the processing of plastics and synthetic resins, comprising a feeding chamber having a front chamber and a rear chamber, the front chamber having a circular portion and the rear chamber having a circularly shaped portion at the central part thereof, the upper portion of the feeding chamber having a feeding inlet. A cutting blade is fixed on the center line of the feeding chamber at the upper end of the circular portion of the front chamber, and a rotary shaft is mounted horizontally on the center line of the circular portion of the front chamber and the circularly shaped portion of the rear chamber. A plurality of wheel blades is fixedly separated on the rotary shaft, and a plurality of stopping materials is positioned respectively between the plurality of wheel blades, the lower portions of the plurality of stopping materials being fixed respectively at the lower portion of the rear chamber. A melting furnace having the shape of a V with respect to the both sides thereof is fixed at the lower portion of the feeding chamber, and an extruding cylinder of an extruding machine is mounted at a lower portion opening of the melting furnace. The V-shaped melting furnace has a plurality of fins mounted vertically to the both inner sides thereof, the width of the fins increasing with decreasing height. The extruding cylinder includes the screw of an extruding machine and the upper inner wall surface of the extruding cylinder coincides with a surface defined by the lower edges of the plurality of fins.

4 Claims, 10 Drawing Figures 4,091,967

DEVICE FOR DEALING WITH THE SCRAPS OF FOAMED THERMOPLASTIC SYNTHETIC RESINS

BACKGROUND OF THE INVENTION

1. Field of the Invention

The present invention relates to a device for dealing with the scraps of the foamed thermoplastic synthetic resins and the odds and ends, the chips and the cut ends during the processing of the plastics and the synthetic resins with good efficiency and for producing good quality reproduced pellets.

2. Description of the Prior Art

Nowadays, there arises the problem of pollution largely with respect to dealing with the scraps of the foamed thermoplastic synthetic resins.

Such foamed thermoplastic synthetic resins as styrol, polyethylene and polypropylene have been used widely in recent times as heat insulating materials, packaging materials and sound insulating materials for their excellent characteristics. However, in the processing of the foamed thermoplastic synthetic resins, there results a large quantity of scraps and a large space is necessary to stock the scraps for a time until they are disposed of. Moreover, there results a large quantity of the broken plastics of the foamed synthetic resins after their usage. However, there is no device to eliminate the pollution that arises during the processing of the foamed thermoplastic synthetic resins.

These foam thermoplastic synthetic resins have many bubbles therein, little apparent specific gravity and a large volume. Therefore, up to this time, the scraps of the foamed thermoplastic synthetic resins or the odds and ends during the processing of synthetic resins could not be fed directly to a conventional extruding machine. Accordingly, they were crushed by a conventional crushing machine and conveyed to the hopper of the conventional extruding machine. The noise generated by the conventional crushing machine gives rise to pollution and it becomes necessary to provide another conveying system and apparatus. Further, with respect to lightweight foaming synthetic resins which have a low apparent specific gravity, it is necessary in order to obtain uniform reproduced materials to extrude with pressure using hydromechanics for extrusion or by a screw for compression in the hooper of the conventional extruding machine. Therefore, the cost of the equipment becomes expensive and the efficiency of dealing with the odds and ends of the synthetic resins is low. These were the defects of conventional devices.

Further, when the scraps of the foamed thermoplastic synthetic resins are extruded, it is necessary to melt the scraps of the foamed thermoplastic synthetic resins and remove bubbles therefrom. Then, the melted and the foam removed scraps of the foamed thermoplastic synthetic resins are fed uniformly to the screw for extruding. However, there is no extruding machine equipped with these melting, foam removing and uniform feeding functions.

SUMMARY OF THE INVENTION

The present invention provides a device capable of efficiently recovering a wide variety of excess or used materials or scraps including those of polyethylene, containers and bottles, films, and others with relatively light nominal specific gravity without the need for crushing them. It is ideally suited for reproducing a large volume or raw materials in pellets.

Accordingly, one object of the present invention is to provide a compact device for dealing directly with the scraps of the foamed thermoplastic synthetic resins and the chips and cut ends during the processing of the plastics and the synthetic resins with a compact mechanism and with high efficiency.

Another object of the present invention is to provide a device for dealing directly with various volumes of such scraps, such chips and such cut ends without rising powders, excess noise caused by crushing and without producing pollution.

Yet another object of the present invention is to provide a device for continuously producing good and uniform quality reproduced pellets of the thermoplastic synthetic resins.

The objects of the present invention are achieved by a device for dealing with chips and cut ends during the processing of plastics and synthetic resins, comprising a feeding chamber having a front chamber and a rear chamber, the front chamber having a circular portion and the rear chamber having a circularly shaped portion at the central part thereof, the upper portion of the feeding chamber having a feeding inlet. A cutting blade is fixed on the center line of the feeding chamber at the upper end of the circular portion of the front chamber, and a rotary shaft is mounted horizontally on the center line of the circular portion of the front chamber and the circularly shaped portion of the rear chamber. A plurality of wheel blades is fixedly separated on the rotary shaft, and a plurality of stopping materials is positioned respectively between the plurality of wheel blades, the lower portions of the plurality of stopping materials being fixed respectively at the lower portion of the rear chamber. A melting furnace having the shape of a V with respect to the both sides thereof is fixed at the lower portion of the feeding chamber, and an extruding cylinder of an extruding machine is mounted at a lower portion opening of the melting furnace. The V-shaped melting furnace has a plurality of fins mounted vertically to the both inner sides thereof, the width of the fins increasing with decreasing height. The extruding cylinder includes the screw of an extruding machine and the upper inner wall surface of the extruding cylinder coincides with a surface defined by the lower edges of the plurality of fins.

BRIEF DESCRIPTION OF THE DRAWINGS

A more complete appreciation of the invention and many of the attendant advantages thereof will be readily obtained as the same becomes better understood by reference to the following detailed description when taken in connection with the accompanying drawings, wherein.

DESCRIPTION OF THE PREFERRED EMBODIMENTS

Figure 1:
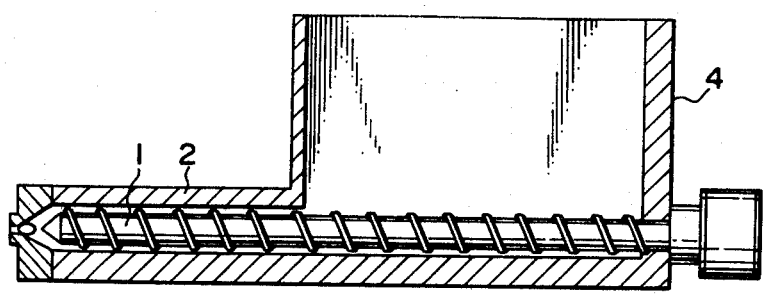
FIG. 1 is the longitudinal front sectional view of one embodiment of the prior art devices for dealing with the scraps of the foamed thermoplastic synthetic resins and the chips and cut ends of plastics and synthetic resins.
Figure 2:
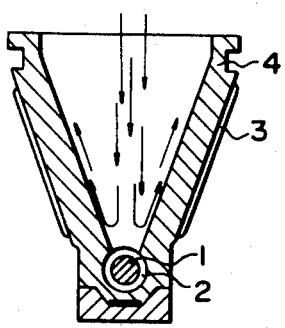
FIG. 2 is the longitudinal side sectional view thereof.
Figure 3:
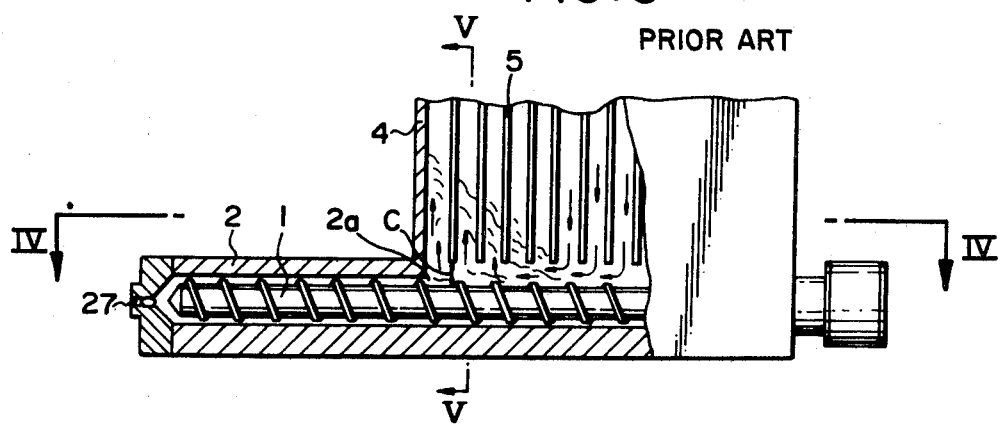
FIG. 3 is the longitudinal front sectional view of another embodiment of the prior art devices.
Figure 4:
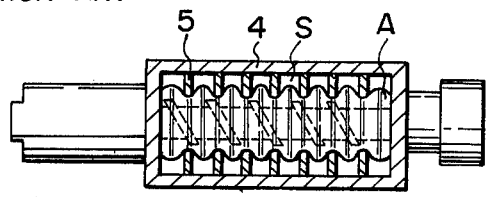
FIG. 4 is the horizontal plane view thereof cut along the line IV-IV of FIG. 3.
Figure 5:
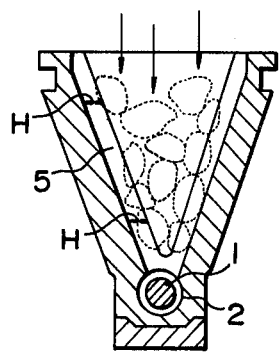
FIG. 5 is the sectional side view of FIG. 3 cut along the line V-V of FIG. 3 and denotes the melting state of the scraps of the foamed thermoplastic synthetic resins.

The present invention will be explained in detail according to the accompanying figures which show preferred embodiments of the present invention, in comparison with the figures that show the defects of the prior art machines for dealing with the scraps of plastics and synthetic resins. As shown in FIG. 1 and in FIG. 2, a conventional extruding machine has a cylinder 2 with an extruding screw 1 therein and a melting furance 4 mounted on the upper portion of the cylider 2. The melting furnace 4 has a V-shaped section and a heater 3 on both of the sides thereof respectively. However, with respect to the extruding machine described above, when various volumes of foamed thermoplastic synthetic resins are fed into the melting furnace 4, the melting operation cannot be done uniformly. Therefore, the melted raw materials cannot be fed to the screw 1 with a uniform and equal distribution and the reproduced materials are not uniform and equal in quality. In the conventional extruding machine, the efficiency of extruding increases when the scraps of foamed thermoplastics fed in the melting furnace 4 are pressed into the cylinder. However, when the scraps are pressed, the pressure concentrates on the lower portion of the melting furnace 4, and the scraps in contact with both sides of the melting furnace 4 are melted, and therefore friction between the melted scraps and the inner side of the melting furnace 4 becomes very low. Accordingly, the melted raw materials of the scraps go upwards, counter to the direction of the processing along the both inner side surfaces of the melting furnace 4 and do not flow down to the cylider smoothly, as the direction of the arrow denotes in FIG. 2. Therefore, in the conventional extruding machine, smooth extrusion cannot be expected. To remove these defects, there has been provided a melting furnace with a plurality of fins 5, projecting horizontally in parallel with each other from the inner sides of the melting furnace and elongated longitudinally therealong. In this melting furnace, as shown in FIG. 4, fed raw materials of the scraps of plastics before being melted are kept at a constant distance S from the inner side surface of the melting furnace 4 by the plurality of fins 5. Therefore, the scraps do not reach both of the inner sides of the melting surface furnace 4. As shown in FIG. 1 and FIG. 2, in a melting furnace without fins, the scraps are directly in contact with the inner surface of the melting furnace. However, in a melting furnace with fins, the scraps do not come in contact with the inner surface of the melting furnace directly and such problem as te fed scraps going upwards along the inner surface of the melting furnace can be prevented. However, as shown in FIG. 3, the lower edges of the plurality of fins are not coplanar with the upper inner surface of the wall of the cylinder and there is a space C between the lower edge of the fins and the upper and inner portion of the cylinder. Therefore, through the space C, the half melted fed raw materials of the scraps A have the tendency to migrate into the space between the lower edges of the plurality of the fins and the blades of the extruding screw in the cylinder in the extunding direction as shown by the arrows. The raw materials cannot enter into the cylinder 2 from the edge portion 2a of the cylinder 2 as shown in FIG. 3 and go back into the melting furnace counter to the extruding direction, and pile and fill therein. This is a major defect of the conventional extruding machine. For the reason described above, the raw materials of the scraps cannot enter the cylinder from the extrusion side of the melting furnace 4 and can enter the cylinder 2 only from the side opposite the extrusion side of the melting furnace. Therefore, smooth feeding of the raw materials of the scraps is prevented, the extrusion efficiency is reduced rapidly and the gases in the melted raw material A extruded by the screw 1 cannot be vented. This is another defect of the conventional extruding machine. Further, no special design is applied to the shape of the plurality of fins 5, and the width of the fins H, that is to say, the horizontal length of the fins, is nearly equal at any vertical portion of the melting furnace. However, the melting furnace has the shape of a V and the pressure of the fed scraps concentrates on the lower portion of the plurality of fins 5. Moreover, the scraps in the lower portion of the melting furnace 4 melt much more than those in the upper portion of the melting furnace 4 and as shown in FIG. 5, the melted raw materials of the scraps of plastics at the low portion of the melting furnace 4 are directly in contact with the both inner side surfaces of the melting furnace 4. Accordingly, there is another defect of the conventional extruding machine in that the plurality of fins 5 cannot be expected to keep the scraps of the raw materials apart from the inner side wall surface of the melting furnace 4 at a constant distance and make the melted raw materials of the scraps flow down along the inner side wall surface of the melting furnace 4 to feed the melted raw materials A smoothly into the cylinder 2.

Figure 6:
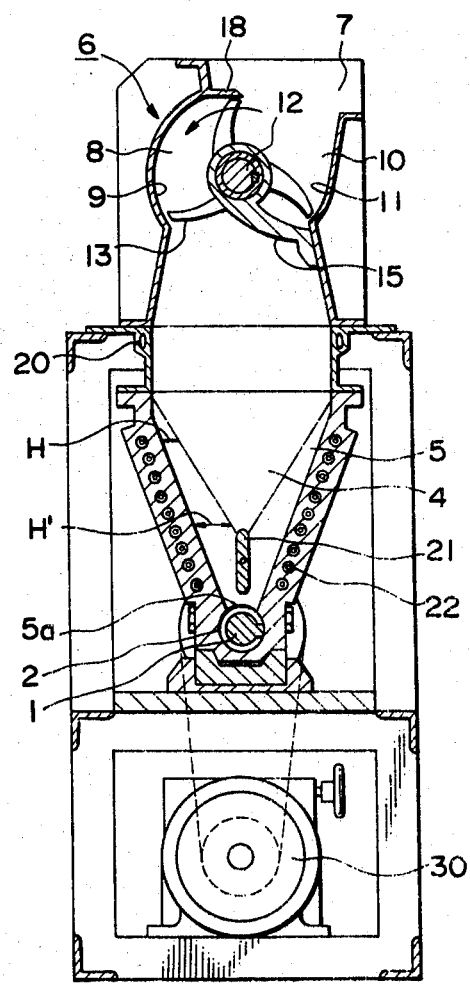
FIG. 6 is a longitudinal side sectional view of one embodiment of the device for dealing with the scraps of the foamed thermoplastic synthetic resins according to the present invention.

The present invention eliminates the above-described defects. The structure of the present invention is explained in detail according to one preferred embodiment of the present invention as shown in FIG. 6 and in FIG. 7 which is the first embodiment of the present invention in this specification. A feeding inlet 7 is mounted at the upper portion of a feeding chamber 6 to feed the scraps of foamed thermoplastic synthetic resins and the chips and cut ends during the processing of synthetic resins and plastics. The feeding chamber 6 has a circular portion 9 at a part of a front chamber 8, the lower portion of the front chamber 8 being inclined to become wider with increasing depth of the front chamber 8, and a little circularly-shaped portion 11 is formed at the central portion of a rear chamber 10 opposite to the front chamber 8, the lower portion of the rear chamber 10 being inclined to become wider with increasing depth of the rear chamber 10. A rotary shaft 12 is horizontally mounted at the center of the feeding chamber 6 and is equipped with a plurality of wheel blades 13, each wheel blade being composed of three blades, a space for a spacer being provided between one wheel blade and another wheel blade. The blades of the wheel blades 13 are respectively curved opposite to the direction of rotation of the wheel blades 13. Between one wheel blade and another wheel blade, a spacer of ring shape 14 is positioned. The rotary shaft 12 with a plurality of wheel blades 13 is mounted so as to be able to rotate in the circular portion 9 and the little circularly-shaped portion 11. Curved stoppers 15 having the shape of a comma-shaped bead are respectively positioned around the outer surface of every spacer 14. One end of each curved stopper 15 is made to form a flange and this flange is fixed to the lower portion of the little circularly-shaped portion 11 of the rear chamber 10.

A final reduction gear 16 communicates with one end of the rotary shaft 12, the reduction gear 16 being connected to a torque motor 17 and the rotary shaft 12 is made to rotate, the number of rotations corresponding to the load applied to the wheel blades 13.

A cutting blade 18 is horizontally fixed at the upper portion of the front chamber 8 on the upper part of the circular portion 9 of the feeding chamber 6 and the cutting edge of the cutting blade 18 is positioned at the center of the feeding chamber 6 and the rotary shaft 12.

Also, a V-shaped melting furnace 4 is fixed at the lower portion of the feeding chamber 6, the melting furnace 4 having both inclined converging side walls respectively converging to the center line portion thereof by means of a connecting chamber 20. A cylinder 2 for an extruding machine is horizontally fixed to the longitudinal direction of the melting furnace 4. The melting flange 4 has a plurality of fins 5, mounted on the inner wall thereof, the width H' at the lower portion of each fin 5 becoming wider than the width H at the upper portion of the fin 5. The cylinder 2 is equipped with a screw shaft and a screw 1 for extruding therein. The lower portion of the plurality of the fins 5 is formed in one body and the bottom surface 5a (Refer to FIG. 6) of the body composing the fins 5 is formed in the same shape as that of the inner surface of the cylinder 2, the space between the bottom surface of the body of the plurality of fins and the blade edge of the screw 1 being made the same as the space between the inner surface of the cylinder 2 and the blade edge of the screw 1 as shown in FIG. 6.

Under the monolithic body of the plurality of the fins 5, is mounted a flow prevention plate 21 which crosses the plurality of fins 5 and is elongated horizontally in and through the melting furnace 4. This flow prevention plate 21 prevents the half melted raw materials of the scraps of foamed plastics from flowing down in the cylinder 2. In the side wall of the melting furnace 4 are inserted a plurality of seasoning heaters 22 for heating and melting the scraps of foamed thermoplastic synthetic resins. If the distance between one fin and another fin is too wide, the fed raw materials A of the scraps of foamed synthetic resins are directly in contact with the inner surface of the melting furnace 4, fall downwards along the inner surface thereof and rise upwards in the opposite direction of the processing through the center portion thereof as did the scraps in the ordinary melting furnace, and if the distance is too narrow, it becomes difficult for the raw materials of the scraps to flow down.

Figure 8:
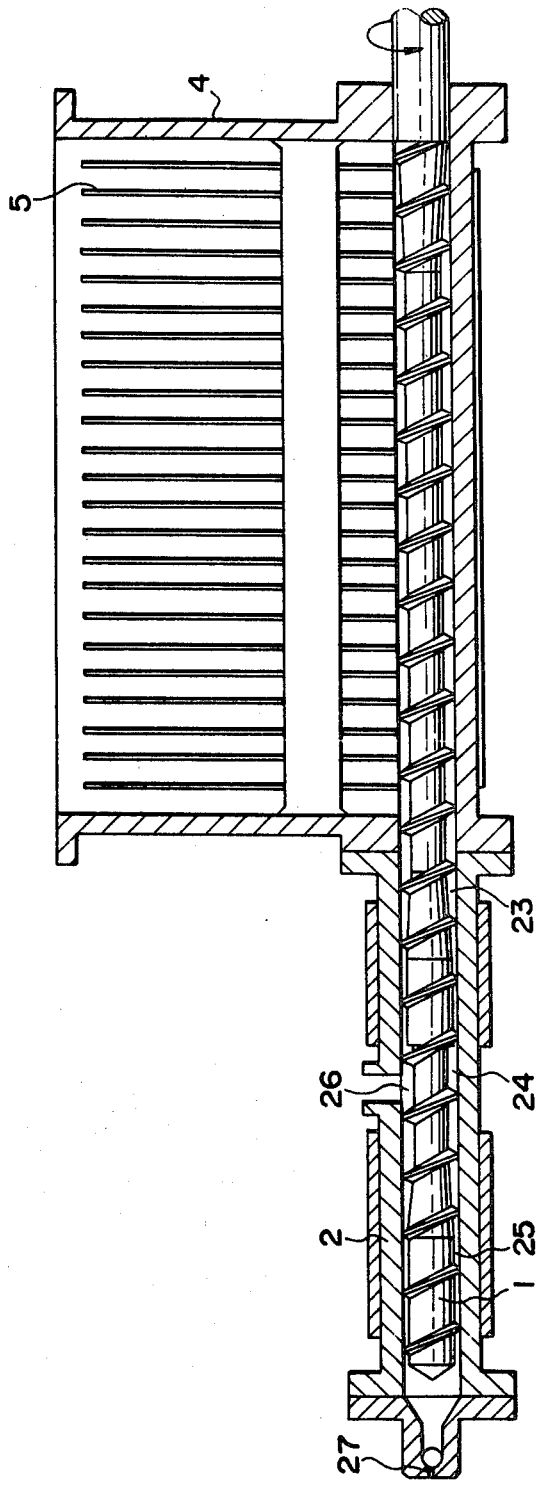
FIG. 8 is the longitudinal front view showing the enlarged portions of the cylinder and the screw of FIG. 7.

An extruding screw 1, as explained in detail in FIG. 8, is so formed as to have such a taper that the core diameter of the extruding screw decreases gradually from the starting point of extruding for one-fifth the length of the melting furnace, and has the same diameter therefrom until the end point of the melting furnace at the extrusion side. It then increases to form a compressing portion 23 for compressing the melted raw materials after which an opening portion 24 is formed as a defoamer where the screw 1 has a smaller diameter, and again increases to form a compressing portion 25. On the upper portion of the cylinder 2 corresponding to the opening portion 24 of the screw 1, if formed a vent 26 for the removal of gas, and the cylidner 2 is fixedly equipped with a nozzle 27 at the tip end thereof.

Figure 7:
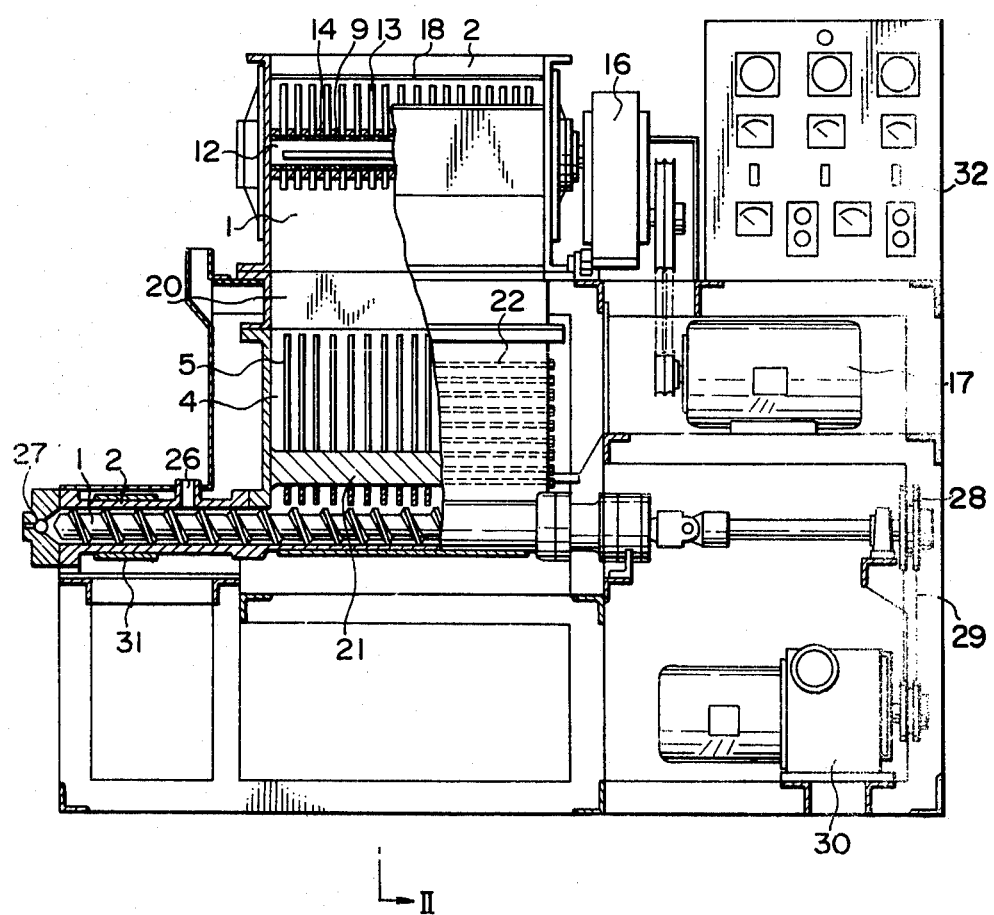
FIG. 7 is the longitudinal sectional front view of the device of FIG. 6.

One end of the screw 1 is connected to a motor 30 by means of a belt pulley 28 and a belt 29 as shown in FIG. 7. In FIG. 7, the numeral 31 denotes a heater mounted on the outer surface of the cylinder 2 and the numeral 32 denotes a panel box which shows the operation state of the device according to the present invention. The heater 31 is mounted at least once around the outer surface of the cylinder 2.

In the first embodiment of the present invention as described above, the scraps of foamed thermoplastic synthetic resins or the chips and cut ends during the processing of plastics or synthetic resins, which are used as raw materials A to be fed, are fed from the feeding inlet 7 and the wheel blades 13 make them rotate in the direction of an arrow by the rotation of the rotary shaft 12 driven by a torque motor 17. As each of the stopping materials 15 has a comma-shaped bead shape, and a curve which is curved in the direction counter to the rotating direction of the wheel blades 13, the angle between the stopping material 15 and the wheel blade 13 is always kept more than 90 degrees, and the fed raw materials A which are fed into the feeding chamber 6 are easily separated from the wheel blades 13 by the plurality of stopping materials 15, do not return to the side of the feeding inlet 7, and are pressed into the melting furnace 4 and compressed.

When the plastics or the synthetic resins liquid of the fed raw materials A fill the opening of the cylinder 2 of the extruding machine, the scraps of foamed thermoplastic synthetic resins and the chips and cut ends of plastics of the fed raw materials fill the melting furnace 4, the load applied to the screw 1 in the cylinder 2 becomes too great for the screw 1, and the pressure of the scraps and the chips and cut ends of plastics of the fed raw materials A reaches its limit, the rotation speed of the rotary shaft 12 is reduced or stopped by means of the action of the torque motor 17, the feed into the feeding chamber 6 is regulated, the pressure in the melting furnace 4 is sustained constant and the device of the present invention is operated in the safety state, the extruding quantity being kept constant. The fed raw materials A pressed into the melting furnace 4 are kept apart from the inner surface of the melting furnace 4 at a constant spacing by means of the plurality of the fins 5, are heated by a seasoning heater 22 through the plurality of fins 5, and melt gradually. The melted raw materials A flow between the inner surface of the melting furnace 4 and the fin 5 and flow into the cylinder 2.

The plurality of fins 5 and the flow prevention plate 21 are necessary for smooth melting of the fed raw materials A. As described above, the width of each fin 5 which is elongated horizontally from the inner surface of the melting furnace 4 becomes wider at the lower portion of the fin as indicated in FIG. 6 going from a value of H to a value of H'. Therefore, the temperature at the tip of each fin 5 in contact with the fed raw materials A becomes lower goind down the fin 5, the fed raw materials A do not touch directly the inner surface of the melting furnace 4 and the flow of the melt along the inner surface thereof to the cylinder 2 is not prevented. Also, the flow prevention plate 21 which is mounted across the plurality of fins 5, in the center of the melting furnace 4 prevents the fed raw materials A which are not melted or are in a half melted state from flowing down into the cylinder 2. Also, the lower edge of the fin 5 is made to form an arc with the same diameter as that of the upper portion inner surface of the cylinder 2. Therefore, there does not exist the problem found in conventional extruding machines which have a little space between the lower edges of the plurality of fins 5 and the cylinder 2. The half melted state fed raw materials in the melting furnace 4 move toward the direction of the extrusion through the space C between the lower edges of the plurality of fins 5, and the blades of the screw 1 by the action caused by the viscosity of the melted fed raw materials A according to the extrusion of the melted fed raw materials A by the screw 1 and flow in the counter direction and pile up on the extruding side portion of the melting furnace 4. Therefore, constant extrusion can be sustained.

Now, the effects of the plurality of fins according to the present invention are as follows:

Heat is transmitted to the scraps of the foamed thermoplastic synthetic resins or the chips and cut ends of plastics in the furnace 4 through the plurality of fins from the heater 22 mounted on the outer surface of the melting surface 4 and the melting of the scraps of the foamed thermoplastic synthetic resins or the chips and cut ends of plastics is accelerated. With the aid of the fins, the melt thereof can flow down with equal distribution and equal quantity. Guided by the fins the melt of the scraps or the chips and cut ends of plastics is distributed equally to the extruding screw of the extruder. If there is no fin, as there is a clearance C between the lower edge of the fin and the upper inner surface of the cylinder, the melt is compelled to gather in the direction of extrusion.

The solid state of the scraps or the chips and cut ends of plastics never adheres to the inner surface of the melting furnace 4. Therefore, it is easy for the scraps or the chips and cut ends of plastics to flow down along the inner surface of the melting furnace 4 when they are melting by the heat from the heater 22. (Refer to FIG. 6).

The reason why the width of the fin is made larger at the lower portion thereof is that as the shape of the melting furnace 4 is like that of the letter V, the pressure of the melt of the scraps or the chips and cut ends of plastics in the melting furnace 4 becomes higher at the lower portion of the furnace. Accordingly, if the width of the fin does not become greater at the lower portion thereof, the scraps or the chips and cut ends of plastics will adhere to the inner surface of the melting furnace 4, and there will not be sufficient clearance between the inner surface of the melting furnace 4 and the scraps or the chips and cut ends of plastics. So, the melt is prevented from flowing down to the opening of the extruder.

If there were no fin, the melt of the scraps or the chips and cut ends of plastics would be pressed upward along the inner surface of the melting furnace 4 by the pressure of the solid state scraps or the chips and cut ends of plastics which are fed from the inlet of the devie as is the case in conventional machines. (Refer to FIG. 2).

Further, if there were no fin, the scraps or the chips and cut ends of plastics fed into the melting furnace would go upwards counter to the feed direction along the inner surface of the V shaped melting furnace 4. This phenomenon arises because of the fact that the scraps or the chips and the cut ends of plastics in contact with the inner surface of the V shape melting furnace 4 melt and have a tendency to slide.

As the lower tip of the fin was made to coincide with the same surface 5a as that of the inner surface of the cylinder of the extruder, the melt of the scraps or the chips and cut ends of plastics flows down with equal quantity and equal distribution independently of the method of the extrusion. (Refer to FIG. 6 in comparison with FIG. 3).

The melted fed raw materials A that have flowed down into the cylinder 2 from the melting furnace 4 melt completely by mixing by means of the rotation of the screw 1, are made to move in the direcion of the nozzle 27. Their pressure is suddenly reduced at the opening portion 24 under the vent 26 and they expel gas included therein from the vent 26. The melted fed raw materials A that expelled gas therein completely are compressed again, the foams therein being eliminated, and are expelled from the nozzle 27 as wires. Gases which arise during the processing are expelled from the vent 26. The melted fed raw materials A which were extruded from the nozzle 27 are cooled in a water tank (not shown in the figure), then are cut into pellets, each of which has a length appropriate for the next processing, by a tip cutter (not shown) and become reproduced raw materials.

Figure 9:
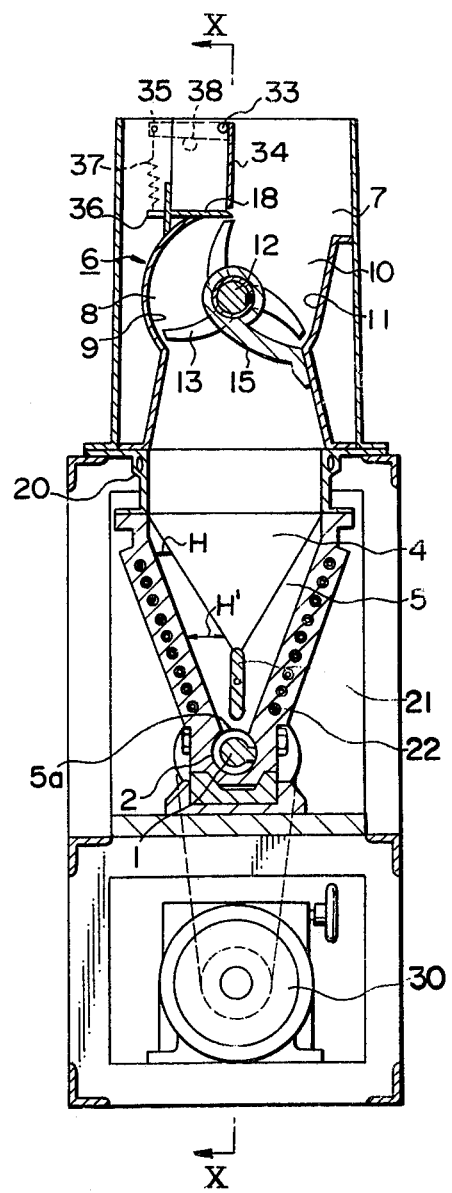
FIG. 9 is the longitudinal side sectional view of another embodiment of the present invention.
Figure 10:
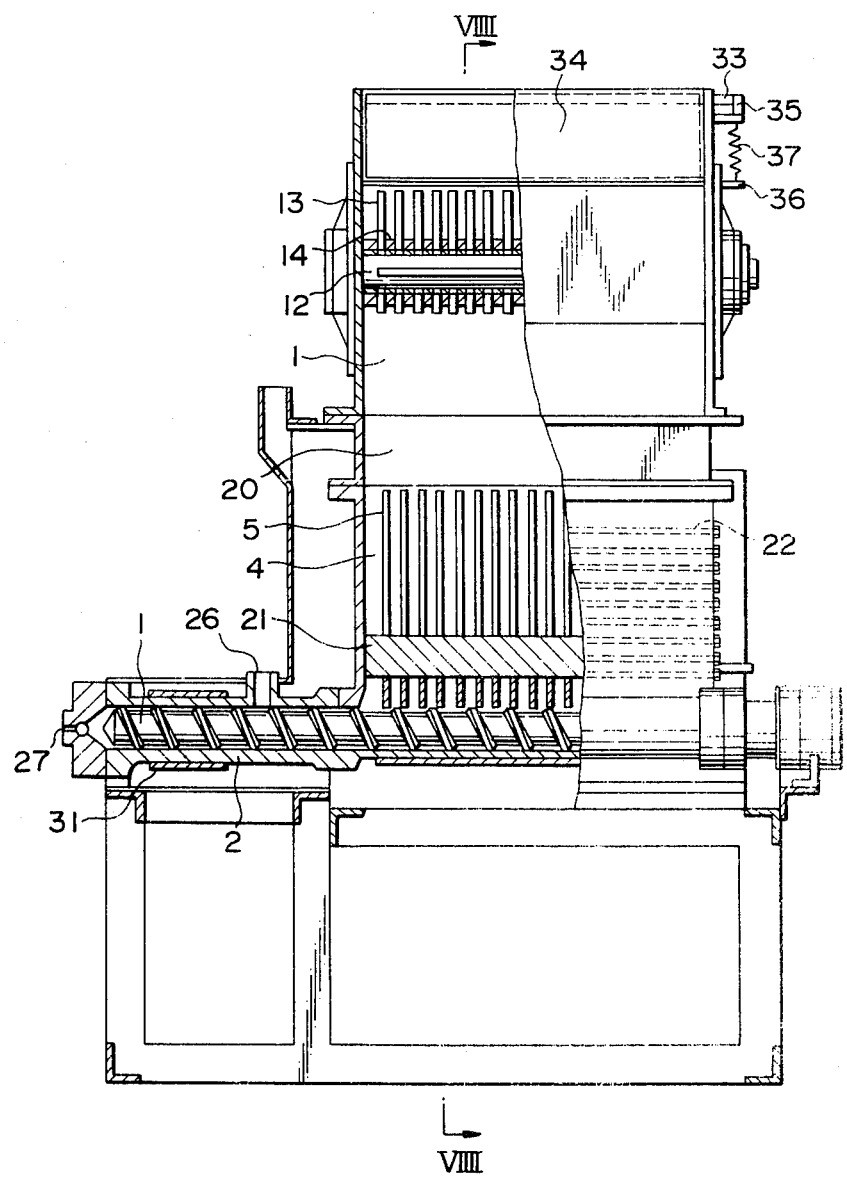
FIG. 10 is the longitudinal sectional front view of FIG. 9 cut along the line X—X of FIG. 9.

The second embodiment of the present invention as shown in FIG. 9 and in FIG. 10 further comprises a movable plate 34. The movable plate 34 is so mounted as to make the lower end thereof positioned over the cutting blade 18 and to keep itself vertical by the force of a coil spring 37. One end of the coil spring 37 is fixed perpendicularly to an elongated arm 35 of an outer end of the movable shaft 33 and the other end of the coil spring is fixed to a projecting part 36 of the feeding chamber 6. The numeral 38 denotes a stopper externally projecting perpendicularly from the front outer surface of the feeding inlet 7. This stopper 38 prevents the arm 35 from moving vertically downwards against the force of the coil spring 37 and the movable plate 34 from going over into the inner side of the feeding inlet 7. The other components of the second embodiment of the present invention are like those of the first embodiment of the present invention. Therefore, the same numerals are applied to the other components of the second embodiment of the present invention as those of the first embodiment of the present invention. With respect to the second embodiment of the present invention, the features of the operation thereof consist in the action of the movable plate 34. The explanation of the other components of the second embodiment is abbreviated. The cutting blade 18 cuts the scraps of the foamed thermoplastic synthetic resins and they are fed into the feeding chamber 6. During cutting, some part of the scraps of the foamed thermoplastic synthetic resins or the chips and cut ends during the processing of plastics or synthetic resins positioned at the upper portion of the cutting blade 18 make the movable plate 34 move outwards by means of the rotation of the blades 13 against the force of the coil spring 37. The other part of the scraps or the other part of the chips and cut ends of plastics are not compelled to return to the inner side of the feeding chamber 6 but are made to move in the rotating direction and are cut completely. The scraps or the chips and cut end of plastics that made the movable plate 34 move outwards are made to return in the direction of the feeding inlet 7 by the counterclockwise directed force caused by the coil spring 37 and are cut by the next blade 13, being fed into the feeding chamber 6. The scraps or the chips and cut ends of plastics that are cut by the cutting blade 18 and a plurality of wheel blades 13 and fed into the feeding chamber 6 are prevented from returning to the side of the feeding inlet 7 by the stopping material 15. They fall into the melting furnace where they are compressed, and then melted gradually by heat from a seasoning heater 22. Next, they flow down between fins 5 into the cylinder 2 of the extruding machine, are mixed during the passage in the extruded direction thereof, the foams therein being eliminated, and are extruded from the nozzle 27 as wires. Gases during the processing are expelled from the vent 26.

As described above, the fed raw materials A of the scraps or the chips and the cut ends of plastics do not remain on the cutting blade 18 and all of the fed raw materials A are fed into the melting furnace 4 without fail.

The reproduced synthetic resin that is extruded as wires, is first cooled and then cut into pellets as reproduced raw materials. When impurities exist in the reproduced synthetic resin, it is cut into the standard length of the chips at the outlet of the nozzle 27 during the heated state thereof.

In the above-described embodiments of the present invention, it is explained that the movable plate 34 may be mounted above the cutting blade 18. However, the movable plate 34 is mounted so as to make it easy to generate cracks between the scraps or the chips and cut ends of plastics in the feeding chamber 6 during the passage thereof in the rotating direction of the wheel blades 13. Therefore, even if the movable plate 34 is not mounted, cutting can be accomplished as a matter of course.

As the present invention has the structure and the function described in the embodiments thereof, the scraps or the chips and cut ends are cut by the cutting blade 18, are compressed by the wheel blades 13, and are fed into the feeding chamber 6. Therefore, it is not necessary to cut the scraps or the chips and cut ends of plastics before they are fed into the feeding inlet 7 and there is no problem of noise pollution or dust. Also, with a melting furnace 4 of V shape, the scraps or the chips and cut ends of plastics are compressed and melt, therefore the melt thereof is always fed uniformly to the cylinder 2 of an extruding machine and the reproduced synthetic resin is extruded from the nozzle 27 at a constant rate. Furthermore, according to the present invention, it is not necessary to have another extruding device, a constant feeding pressure of the melt of the fed raw materials is always sustained, the melted raw materials are fed into the cylinder at a constant rate, and uniformly reproduced materials of good quality are reproduced continuously by a simple operation.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for dealing with the scraps of the foamed thermoplastic synthetic resins and the chips and cut ends during the processing of plastics and synthetic resins comprising:
    a feeding chamber having a front chamber and a rear chamber, the front chamber having a circular portion and the rear chamber 10 having a circularly shaped portion at the central part thereof, the upper portion of the feeding chamber having a feeding inlet positioned thereat;
    a cutting blade fixed on the center line of the feeding chamber at the upper end of the circular portion of the front chamber;
    a rotary shaft mounted horizontally on the center line of the circular portion of the front chamber and the circularly shaped portion of the rear chamber;
    a plurality of wheel blades fixedly separated on the rotary shaft;
    a plurality of stopping materials positioned respectively between the plurality of wheel blades, the lower portions of the plurality of stopping materials being fixed respectively at the lower portion of the rear chamber;
    a melting furnace having the shape of a V with respect to both sides thereof fixed at the lower portion of the feeding chamber, and having a plurality of fins mounted vertically to the both inner sides thereof, the width of the fins increasing with decreasing height; and
    an extruding cylinder including a screw therein mounted at a lower portion opening of the melting furnace, the upper inner wall surface thereof coinciding with the surface defined by the lower edges of the plurality of fins.

2. The device recited in claim 1, wherein:
    the blade of each of the plurality of wheel blades is curved counter to its rotating direction; and
    each of the plurality of stopping materials is shaped like a comma-shaped bead.

3. The device recited in claim 1, including:
    a flow prevention plate mounted across the plurality of fins in the center of the melting furnace.

4. The device recited in claim 1, including:
    a movable plate mounted to the feeding chamber with the lower edge thereof positioned near the tip of the cutting blade and constrained to keep itself vertical.

* * * * *